United States Patent [19]
Clavin

[11] 3,920,171
[45] Nov. 18, 1975

[54] APPARATUS FOR POSITIONING AND CLAMPING PIPES FOR WELDING

[75] Inventor: Edward A. Clavin, Houston, Tex.

[73] Assignee: CRC-Crose International, Inc., Houston, Tex.

[22] Filed: Feb. 1, 1974

[21] Appl. No.: 438,646

[52] U.S. Cl. .................. 228/44; 29/493; 269/48.1; 228/213
[51] Int. Cl.² .......................................... B23Q 3/14
[58] Field of Search ......... 29/200 P, 493; 228/4, 44, 228/49, 50; 269/48.1, 50, 52, 34

[56] References Cited
UNITED STATES PATENTS

| | | | |
|---|---|---|---|
| 2,413,103 | 12/1946 | Forbes | 269/48.1 |
| 2,525,680 | 10/1950 | Ingemarson | 269/52 |
| 3,387,761 | 6/1968 | Pickard | 228/50 |
| 3,445,104 | 5/1969 | Douglas | 269/48.1 |
| 3,561,320 | 2/1971 | Nelson | 29/493 |
| 3,732,391 | 5/1973 | La Force et al. | 228/44 |

FOREIGN PATENTS OR APPLICATIONS

| 1,240,158 | 9/1959 | France | 269/48.1 |
|---|---|---|---|

Primary Examiner—Al Lawrence Smith
Assistant Examiner—Robert C. Watson
Attorney, Agent, or Firm—Jack R. Springgate; William L. LaFuze

[57] ABSTRACT

A method and apparatus for positioning pipes for end-to-end welding wherein the apparatus includes a pipe alignment clamp, gripping shoes supported at the forward end of the alignment clamp, and actuating means connected to the gripping shoes so that the shoes may be set in a second pipe with the alignment clamp in the end of a first pipe and the second pipe is pulled or positively positioned in welding position with spacer fingers defining the preselected space between the ends of the two pipes and wherein the method includes the steps of securing the alignment clamp within the end of the first pipe, moving the second pipe over the end of the clamp, engaging the interior of the second pipe and pulling or positively positioning the second pipe into welding position with respect to the first pipe.

7 Claims, 2 Drawing Figures

APPARATUS FOR POSITIONING AND CLAMPING PIPES FOR WELDING

BACKGROUND OF THE INVENTION

1. Field

This invention relates to an apparatus and method for positioning and clamping pipes into aligned abutment for welding.

2. The Prior Art

Methods and apparatus for positioning and clamping pipe sections in an abutting relationship for the purpose of welding the ends of the pipe sections together are known. A typical apparatus which is known includes an alignment clamp assembly which is positioned in the end of a first pipe section where a first set of clamping elements are set therein. The clamp assembly has a generally rounded nose structure which protrudes beyond the end of the first pipe section and guides the end of a second pipe section into an abutting relationship to the end of the first pipe section. The second pipe is moved into position in the best manner available, usually with the pipe supported on a sling. Thereafter the second set of clamping elements are set in the second pipe to align it with the first pipe and hold it for welding.

The present invention provides an improved method and apparatus for moving a second pipe into its desired position for welding relative to a first pipe and for clamping and aligning the two pipes during welding.

Thus, an object of the invention is to provide a method and apparatus to move pipes into position and to clamp and align the pipes for welding their ends together.

Another object of the invention is to provide a method and an apparatus for urging two pipes together into aligned abutment.

Another object of the invention is to provide a method and an apparatus for positively positioning and clamping the ends of two pipes in aligned abutment with a preselected space existing between the pipe ends.

BRIEF DESCRIPTION OF THE DRAWINGS

The foregoing and other objects, features and advantages of the invention will be apparent from the following more particular description of a preferred embodiment of the invention as illustrated in the accompanying drawings wherein like reference numerals indicate like parts in which.

DESCRIPTION OF THE PREFERRED EMBODIMENTS

Figure 1:
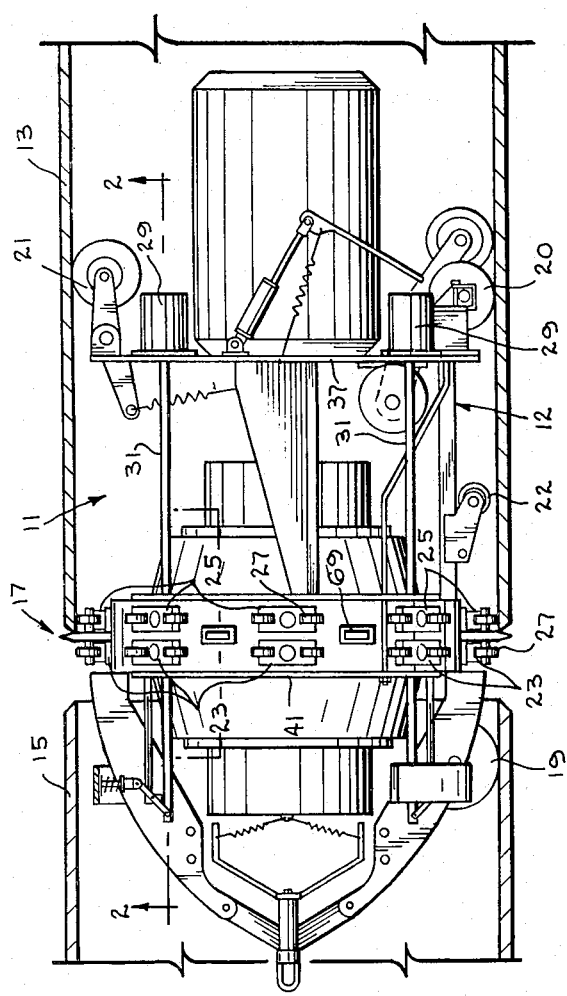
FIG. 1 is a sectional view of the alignment clamp within a pipe embodying the invention.

Referring to FIG. 1, an internal alignment clamp assembly 11 which embodies the invention herein is shown. This clamp assembly 11 is an improvement of the apparatus described in U.S. Pat. No. 3,044,431 of July 7, 1962, to E. E. Cummings and the description of Cummings' apparatus is incorporated herein by reference.

The pipe clamp assembly 11 functions primarily to position pipes 13 and 15 in aligned abutment, space the ends of pipes 13 and 15 at joint 17 properly at a preselected distance, and hold the two pipes 13 and 15 in the desired position for welding.

The pipe clamp housing 12, as shown in FIG. 1, is adapted to move axially through pipes 13 and 15 aided by wheels 19, 20, 21 and 22. The clamp assembly 11 has the forward plungers 23 and the rear plungers 25 which are independently controlled to expand outwardly such that the rollers 27 on each plunger securely engage the interior wall of the pipe. Plungers 23 and 25 may be referred to herein simply as clamps. When fully extended, plungers 25 secure the clamp assembly 11 in pipe 13 and plungers 23 prevent axial movement of pipe 15. The piston and actuator system associated with plungers 23 and 25 is more fully described in the patent to Cummings. Plungers 23 and 25 and their respective actuators comprise a means for holding pipes 13 and 15 in aligned abutment.

Figure 2:
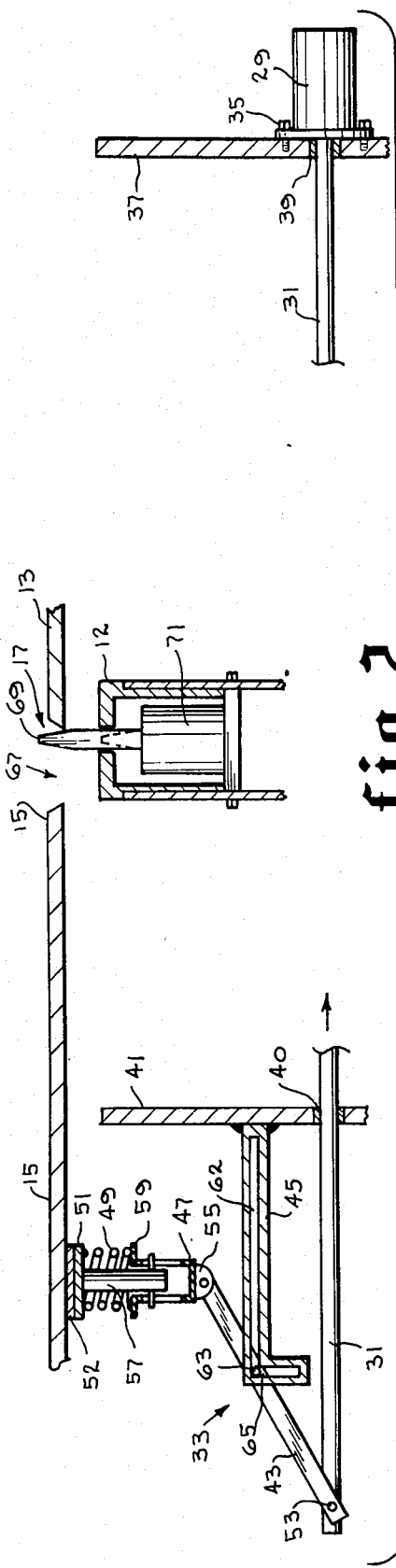
FIG. 2 is a partial sectional view illustrating the positioning means, its actuators and the spacing means taken along line 2—2 in FIG. 1.

A means for positioning pipes 13 and 15 into aligned abutment comprises actuator 29, connecting rod 31, and means 33 for gripping the interior pipe 15. As best shown in FIG. 2 wherein one of the plurality of positioning means is shown, the actuator 29 is fastened securely by bolts 35 or other suitable means to frame plate 37. The actuator 29 is adapted to move rod 31 in a direction parallel to the axes of the pipes 13 and 15 and suitable bearing means 39 and 40 allow the rod 31 to move slidably through apertures in plates 37 and 41 to the actuator 29.

The gripping means 33 which is connected to rod 31 comprises lever 43, slotted guide 45, cup 47, spring 49, shoe 51 and shoe pad 52. One end of lever 43 is pivotally connected to rod 31 by a pin 53, while the other end of lever 43 is pivotally connected to a lug 55 on cup 47. The cup 47 slides on the cylinder 57 which is secured to shoe 51 by suitable means such as welding. Spring 49 is positioned around the cylinder rod 57 between the flanges 59 of cup 47 and shoe 51, thus biasing shoe 51 outwardly into firm engagement with the pipe 15. The shoe pad 52 is of a suitable material to grip the interior of the pipe 15 when the gripping means 33 is set.

The slotted guide 45 is welded to wall 41. The guide 45 defines the angled slot 62 through which pin 63 extends, pin 63 being attached securely to lever 43.

The operation of each of the positioning means is as follows. The actuator 29 pulls on connecting rod 31 causing the rod 31 to move parallel to the pipe axes in a direction toward pipe 13 and away from pipe 15. Lever 43 pivots about pin 63 causing the shoe 51 to move toward engagement with the interior of the pipe 15. The dimensions of the lever 43 and guide slot 62 and the placement of the pin 63 on the lever 43 are designed such that the pad 52 on shoe 51 reaches a tight engagement with the interior of the pipe 15 when the pin 63 reaches the corner position 65 of the guide 45. After the shoe 51 is engaging the interior of the pipe 15 and pin 63 has reached point 65 of the slot 62, further movement of rod 31 toward pipe 13 causes the pipe 15 to be moved toward pipe 13, thus narrowing the gap 67 and moving pipes 13 and 15 into the desired welding position.

A means for preselecting the space between pipes 13 and 15 is provided on the clamp assembly 11 to insure that the desired space remains between pipes 13 and 15 when they are aligned for welding at the joint 17. Referring to FIG. 1, a plurality of spacing fingers 69 are mounted between the plungers 23 and 25 on the clamp housing 12. As best shown in FIG. 2, an actuator 71 controls the spacing finger 69. When the two pipes are to be joined in aligned position, the actuators 71 cause spacing fingers 69 to extend from each actuator 71 outwardly from the clamp housing 12 to a position between the end surfaces of the pipes to be welded (See FIG. 2). Each actuator 71 is enclosed within housing 12 and is offset as shown in FIG. 1 both from the plungers 23 and 25 and from the rod 31.

The clamp device as described operates in the following manner. The clamp assembly 11 is positioned within pipe 13 and the plungers 25 are extended so that the rollers 27 thereon secure the assembly 11 to the interior of pipe 13. Then the spacing fingers 69 are extended to a position adjacent to the end of pipe 13. Pipe 15 is then moved into place over the nose section of clamp housing 12. Actuator 29 then moves rod 31 parallel to the pipe axes in direction from pipe 15 to pipe 13. This motion causes the shoe 51 to engage the interior of pipe 15 after which continuing movement of rod 31 causes the rod 31 and the means for gripping 33 to move the end of pipe 15 closer to the end of pipe 13. This motion is continued until the pipe 15 is brought into tight contact with the spacing fingers 69 set between pipes 13 and 15. Then the plungers 23 are projected outwardly into firm engagement with pipe 15 after which the spacing fingers 69 are retracted to a position within the clamp housing 12. The pipes 13 and 15 are then in aligned position to be welded at joint 17.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An apparatus for aligning pipe, comprising:

a housing, said housing of suitable size to fit wholly within a pipe;

means for positioning the ends of a first and a second pipe into abutment;

means for clamping said first and second pipes in aligned abuttent while the adjacent ends of said first and second pipes are welded together;

means for spacing the ends of said first and second pipe by a preselected distance when said pipes are positioned in aligned abutment;

said positioning means including a rod, said rod supported by said housing within said first and second pipes, said rod being positioned parallel to the axis of said first pipe in which the housing is located, said rod extending to a position within said second pipe;

a means for gripping said second pipe, said gripping means connected to said rod, said gripping means adapted to expand from a position within said second pipe to engage securely the interior of said second pipe responsive to lateral displacement of said rod in a direction toward said first pipe, said gripping means adapted to displace said second pipe toward said first pipe responsive to further lateral displacement of said rod in a direction toward said first pipe after said gripping means has securely engaged said second pipe;

an actuator, said actuator causing said rod to be displaced along a line parallel to the axis of said first and second pipes;

said gripping means including a shoe for contacting the interior of said second pipe, said shoe having a supporting cylinder thereon;

a lever, said lever connected pivotally to said rod and pivotally to said shoe, said lever having a pin thereon between the connection of said rod and said shoe, said pin serving as a fulcrum for said lever; and a slotted guide, said guide connected to said housing, said guide adapted for receiving the pin on said lever and guiding said pin responsive to displacement of said rod in a direction toward said first pipe causing the lever to pivot about the pin such that the shoe assembly contacts securely the interior of the second pipe, thereafter causing the shoe to displace said second pipe in a direction toward said first pipe.

2. The apparatus of claim 1 including:

a cup, said cup including means for connecting pivotally said cup to said lever, said cup adapted for receiving slidably the supporting cylinder on said shoe; and a spring, said spring confined between said shoe and said cup, said spring urging said shoe outwardly into firm engagement with the interior of said second pipe.

3. An apparatus for aligning pipe, comprising:

housing means, said housing means of suitable size to fit wholly within a pipe or plurality of pipes;

a first clamp, said first clamp connected to said housing and adapted to project outwardly from said housing to engage securely the interior of a first pipe;

a second clamp, said second clamp connected to said housing and adapted to project outwardly from said housing to engage securely the interior of a second pipe;

means for positioning said first and second pipes into aligned abutment;

said positioning means including a rod, said rod supported by said housing within said first and second pipes, said rod being positioned parallel to the axis of said first pipe in which the housing is located, said rod extending to a position within said second pipe; and means for gripping said second pipe, said gripping means connected to said rod, said gripping means adapted to expand from a position within said second pipe responsive to lateral displacement of said rod in a direction toward said first pipe, said gripping means adapted to displace said second pipe toward said first pipe responsive to lateral displacement of said rod in a direction toward said first pipe after said gripping means has securely engaged said second pipe;

said gripping means including a shoe for contacting the interior of said second pipe, said shoe having a supporting cylinder thereon;

a lever, said lever connected pivotally to said rod and pivotally to said shoe, said lever having a pin thereon between the connection of said rod and said shoe, said pin serving as a fulcrum for said lever; and a slotted guide, said guide connected to said housing, said guide adapted for receiving the pin on said lever and guiding said pin responsive to displacement of said rod in a direction toward said first pipe causing the lever to pivot about the pin such that the shoe contacts securely the interior of the second pipe, thereafter causing the shoe to displace said second pipe in a direction toward said first pipe.

4. The apparatus of claim 3 including:

a cup, said cup including means for connecting pivotally said cup to said lever, said cup adapted for receiving slidably the supporting rod on said shoe; and a spring, said spring confined between said shoe and said cup, said spring urging said shoe outwardly into firm engagement with the interior of said second pipe.

5. The apparatus of claim 4 including a shoe pad, said pad mounted on said shoe such that the shoe pad engages the interior surface of said second pipe.

6. An apparatus for positioning pipes for welding comprising:

a housing;

two sets of radially movable plungers supported on said housing;

means for moving said housing in a pipe;

gripping means supported on said housing forward of said plungers;

means for moving said gripping means which gripping means engage the interior of a pipe to move the pipe into welding position with respect to the end of a pipe in which the apparatus is positioned;

said gripping means including a shoe for contacting the interior of said second pipe, said shoe having a supporting cylinder thereon;

a lever, said lever connected to said rod pivotally and to said shoe pivotally, said lever having a pin thereon between the connection of said rod and said shoe, said pin serving as a fulcrum for said lever; and a slotted guide, said guide connected to said housing, said guide adapted for receiving the pin on said lever and guiding said pin responsive to displacement of said rod in a direction toward said first pipe causing the lever to pivot about the pin such that the shoe contacts securely the interior of the second pipe, thereafter causing the shoe to displace said second pipe in a direction toward said first pipe.

7. The apparatus of claim 6 including:

a cup, said cup including means for connecting pivotally said cup to said lever, said cup adapted for receiving slidably the supporting rod on said shoe; and a spring, said spring confined between said shoe and said cup, said spring urging said shoe outwardly into firm engagement with the interior of said second pipe.

* * * * *